United States Patent [19]

Otto

[11] 3,898,276

[45] Aug. 5, 1975

[54] PROCESS FOR THE PREPARATION OF SELENOMETHIONINE-SE[75]

[75] Inventor: Petrus P. H. L. Otto, Delft, Netherlands

[73] Assignee: U.S. Philips Corporation, New York, N.Y.

[22] Filed: Oct. 15, 1973

[21] Appl. No.: 406,583

Related U.S. Application Data

[63] Continuation-in-part of Ser. No. 41,444, May 28, 1970, abandoned.

[30] Foreign Application Priority Data

June 6, 1969  Netherlands....................... 6908609

[52] U.S. Cl.... 260/534 R; 260/268 DK; 260/607 R
[51] Int. Cl.......................................... C07c 163/00
[58] Field of Search.......... 260/534 R, 607 R, 534 S

[56] References Cited

UNITED STATES PATENTS

| 2,452,653 | 11/1948 | Harris et al...................... | 260/534 S |
| 3,363,001 | 1/1968 | Schlecter et al. ............... | 260/648 R |
| 3,678,067 | 7/1972 | Grummon et al............... | 260/534 R |

FOREIGN PATENTS OR APPLICATIONS

| 2,026,937 | 12/1970 | Germany |
| 943,292 | 5/1956 | Germany |

OTHER PUBLICATIONS

Painter, J. Am. Chem. Soc. 69 232–234 (1947).
March "Advanced Organic Chemistry," McGraw–Hill (1968) 473.
Snyder et al. J. Am. Chem. Soc. 64 2082 (1942).
Greenstein "Chemistry of the Amino Acids," Wiley & Sons, Inc. (1961) Vol. 3 2142.

*Primary Examiner*—Lorraine A. Weinberger
*Assistant Examiner*—John F. Terapane
*Attorney, Agent, or Firm*—Frank R. Trifari; Norman N. Spain

[57] ABSTRACT

The invention relates to a chemical synthesis of the radioactive substance selenomethionine-Se[75] ($CH_3Se-CH_2-CH(NH_2)-COOH$) starting from radioactive labelled selenium. The radioactive selenomethionine-Se[75] is used as a tracer for tumors especially for the scanning of the pancreas.

2 Claims, 8 Drawing Figures

3,898,276

PROCESS FOR THE PREPARATION OF SELENOMETHIONINE-SE[75]

This application is a continuation-in-part of U.S. Pat. application Ser. No. 41,444, filed May 28, 1970, now abandoned.

One aspect of the invention relates to a process for the preparation of selenomethionine-Se[75]. Another aspect of the invention relates to the preparation of lithium methyl selenide -Se[75], an intermediate for the preparation of selenomethionine-SE[75].

Selenomethionine is known in the art; it has the formula as shown under 5. of the attached formula sheet. In this formula Se* stands for radioactive selenium, that is selenium enriched with selenium [75]. The said selenomethionine-Se[75] is useful for tracing tumors.

The methods known in the art result in a low yield of the selenomethione-Se 75 which means a serious drawback for a radioactive labelled substance.

The process for obtaining the known compound selenomethionine-Se[75] having the formula $CH_3$-Se*-$CH_2$ $CH_2$-$CH(NH_2)$-COOH, in which formula Se* stands for radioactive labelled selenium, that is ordinary seleneum enriched with Se[75], is, according to the invention, firstly characterized in that selenium, labelled with radio-isothope Se[75], is converted, in an oxygen-free solution of tetrahydrofuran at a temperature between +10° and −15°C, into lithium methylselenide-Se[75] ($CH_3$Se Li). Then this selenide is converted by means of an approximately equivalent amount of an acid into methylselenol-Se[75] ($CH_3$Se H). Then this selenol compound by means of sodium methylate and/or lithium methylate, is converted into sodium methylselenide ($CH_3$ Se Na) and/or lithium methylselenide ($CH_3$Se Li), which then is reacted with dihaloethyl-diketopiperazine, whereupon the reaction product is cleaved by means of an acid and selenomethionine-Se[75] is isolated, together with ordinary selenomethionine.

The various reaction stages are shown on the formula sheet up to and including 4. The product desired is obtained by hydrolytical cleavage of the product of reaction 4.

Chemically speaking it makes no difference whether or not radioactive selenium is used. Apart from the precautions against the radiation hazard one can just as well start from selenium with a radio-activity of a fraction of a millicurie per millimol to a multiple of curies per millimol.

A variation is possible. According to the present knowledge the best way to arrive at the product desired is by using sodium methylselenide and/or lithium methylselenide, and having it reacted with dichloroethyldiketopiperazine (reaction 4. formula sheet). After cleavage of the reaction product the product desired is immediately obtained.

However, the same result is obtained with derivatives of

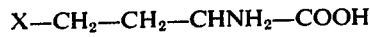

X—$CH_2$—$CH_2$—$CHNH_2$—COOH (homoserine, in which the OH-group of the ethyl group has been replaced by chlorine, bromine or iodine indicated as X). As with many of such substances also in this instance the $NH_2$-group should temporarily be blocked. Then the reaction should be completed and finally the $NH_2$-group should be unblocked again. That is a NHR-group is temporarily formed in which R may be one of the blockingunblocking groups known in the art such as benzoyl, t-butoxycarbonyl and the like. Mostly it is also desired to block the carboxyl group. In that case, temporary esterification is the obvious method (e.g. methyl, ethyl or benzyl ester). In such a case one gets reactions of types 4a, 4b and 4c as shown on the formula sheet. Subsequently the reaction product is unblocked by treatment with acid and the product desired is obtained again.

However, since at the present time, dichloroethyldiketopiperazine is most readily obtained, at present there is no reason to employ 4a, 4b or 4c. This will change, however, as soon as a more advantageous synthesis for these homoserine derivatives has been found.

All reactions proceed well when using approximately stoichiometric amounts of the reactants. Consequently in reaction 4, approximately 2 mol $CH_3$Se M will be reacted with the dihaloethyl diketopiperazine.

Reaction 2 requires the use of an acid. For this purpose an approximately equimolar amount of $H_2SO_4$ as diluted sulphuric acid or another mineral acid can be employed.

With reaction 3. (also for the ethylate reaction) it is highly advisable to use a lower aliphatic alcohol, such as methylalcohol or ethyl alcohol.

It is extremely vital that reaction 1 is allowed to proceed in tetrahydrofuran at a temperature not above 10°C and not below −15°C.

It will be observed that dihaloethyldiketopiperazine is blocked twice by the presence of two —CO—NH— groupings which is also a reason for using this compound.

Exclusion of oxygen and moisture is necessary certainly up to and including the formation of the methyl selenol and preferably with all reactions.

EXAMPLE 1

Methyl lithium was prepared in the usual way from lithium and methyl iodide in dry diethyl ether. The ether was distilled in vacuo and replaced by oxygen-free dry tetrahydrofuran. The content was approximately 1 millimol methyllithium per ml solvent (determined titrimetrically).

Thus to 3 millimol of powdered selenium, labelled with radio-active Se[75] in an amount such that the activity was 1 millicurie per millimol of selenium there was slowly added, while stirring and while passing over a stream of nitrogen, a solution of about 3 millimol of methyl lithium in tetrahydrofuran under oxygen free and anhydrous conditions and while cooling in a bath to −5°C. So much methyllithium was added, that the initially dark red colored solution was entirely discolored. The lithium methyl selenide Se[75] formed was decomposed by means of an equivalent amount of diluted sulphuric acid (50 percent by weight) and the methyl selenol was distilled over in high vacuum. All these operations were carried out under absolute exclusion of oxygen and moisture. The yield was approximately 90 percent. To the methylselenol distilled over an equivalent amount of sodium methylate in methanol (2 ml) was added, whereupon all volatile components were distilled off in high vacuum. To the remaining sodium methyl selenide a suspension of an equivalent amount of dichloroethyldiketopiperazine (approximately 1.4 mmol) in 8 ml dry oxygenfree ethanol was added. This mixture was heated at 50°C for 2 hours while being stirred, evaporated to dryness in a high vacuum and the residue was hydrolyzed by heating with concentrated hydrochloric acid. After evaporating to dryness it was taken up in 2.5 N HCl and purified by means of column chromatography over an ion exchanger (Dowex 50 × 8 100–200 mesh, eluate with 2.5 N HCl). Yield 50 percent (calculated on selenium).

In Example 1 the reaction was with dichloroethyldiketopiperazine. It is also possible to use dibromoethyldiketopiperazine in an optically pure L-form.

EXAMPLE 2

The procedure according to Example 1 was repeated up to and including obtaining the remaining solution of sodium methyl selenide. Then a suspension of an equivalent amount of dibromoethyldiketo piperazine in an optical pure form of L-3,6-bis ($\beta$-bromoethyl)-2,5-diketopiperazine (approximately 1.4 mmol dissolved in 8 ml dry oxygen-free methanol) was added by injection. The whole mixture was heated for 45 minutes in an oil bath of 45°–50°C. The pH was adjusted and kept on a value of 9.0-9.2 by carefully adding a solution of NaOCH$_3$ in methanol. The concentration of this solution was about 0.6 N NaOCH$_3$. At the end of the reaction the reaction mass was acidified with dilute sulphuric acid to a pH value of about 3. While stirring the methanol was evaporated at an initial temperature of −10°C which temperature was then allowed to rise slowly.

To the residue there was added 30 ml of hydrochloric acid 2.5 NHCl and the whole was heated for 15 hours at about 125°C under an oxygen-free argon atmosphere. The reaction product was purified by means of column chromatography as in Example 1. The yield was 51 percent of optically pure L-selenomethionine-Se$^{75}$.

In general, if dibromoethyldiketopiperazine is used the pH of the solution with sodium or lithium methylselenide should preferably be kept between pH=9 and pH=11. This appears to be the range in which no substantial racemization of the dibromoethyldiketo piperazine occurs. The reaction with dichloroethyldiketopiperazine is rather slow under these conditions.

It is possible to carry out the whole reaction in one vessel provided that the initial methyl lithium solution (FIG. 1) does not contain any iodides. Such iodides may normally be present as a result of the preparation of methyl lithium. In the Examples they would not do any harm because there the preparation of methyl lithium is followed by a distillation in vacuo, before further reactions were carried out. The presence of iodides would in a later stage lead to the formation of H$_1$ which would destroy a significant portion of the selenomethionine formed.

The hydrolytic cleavage of the diketopiperazine ring proceeds swiftly with hydrochloric acid of, for example a strength of 2.5 N. After that in some hours e.g. 15 hours, the cleavage is complete. No racemization occurs in this step. Hydrolysis can be performed in a shorter time by using a concentrated acid but then there is a danger of decomposition of the end product. With very dilute acids the cleavage is slow.

It is desirable to remove the alcohol used as a solvent in the coupling reaction as far as possible. Methanol is preferred because with e.g. ethanol traces of selenoethionine are formed.

FORMULAS

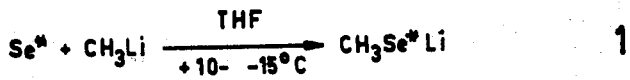

1

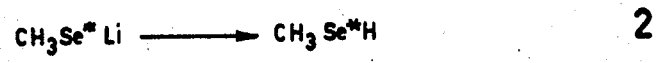

2

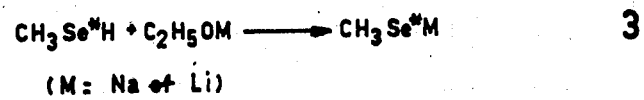

3

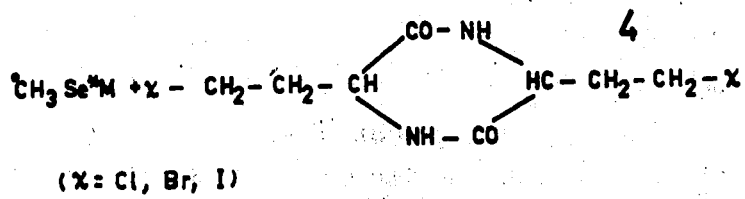

4

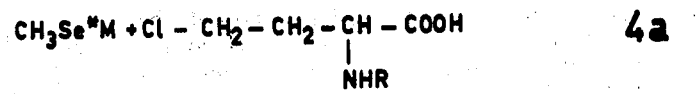

4a

FORMULAS -Continued

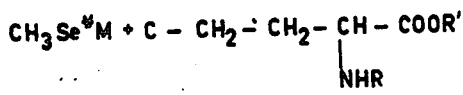   4b

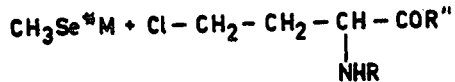   4c

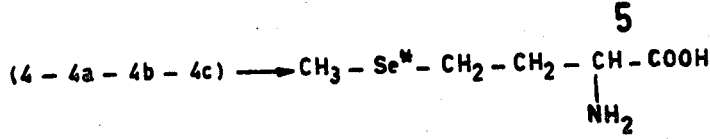

What is claimed is:

1. A process for the preparation of selenomethionine $Se^{75}$ of the formula

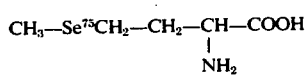

comprising treating seleniom labelled with radio-isotope $Se^{75}$ in the absence of moisture and oxygen and at a reaction temperature of $-15°C$ to $+10°C$ with a solution of iodide free methyl lithium in tetrahydrofuran to form lithium methylselenide, subsequently reacting said lithium methylselenide with a solution of an agent selected from the group consisting of 2,5-bis (α-chloroethyl)-3,6-diketopiperazine and 2,5-bis (α-bromoethyl)-3,6-diketo-piperazine at a temperature of about 45°–50°C and a pH of about 9–11 to yield a product of the formula

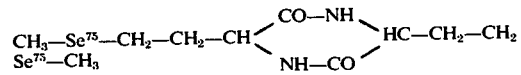

and then treating said latter product with a dilute mineral acid to produce selenomethionine-$Se^{75}$.

2. A process according to claim 1 wherein the lithiummethylselenide is reacted at a pH between 9 and 11 with an anaerobic solution of L-{2,5-bis (α-bromoethyl)-3,6-diketopiperazine}.

* * * * *